May 5, 1925. 1,536,243
R. SUCZEK
AUXILIARY APPARATUS FOR CONDENSERS
Filed April 18, 1922
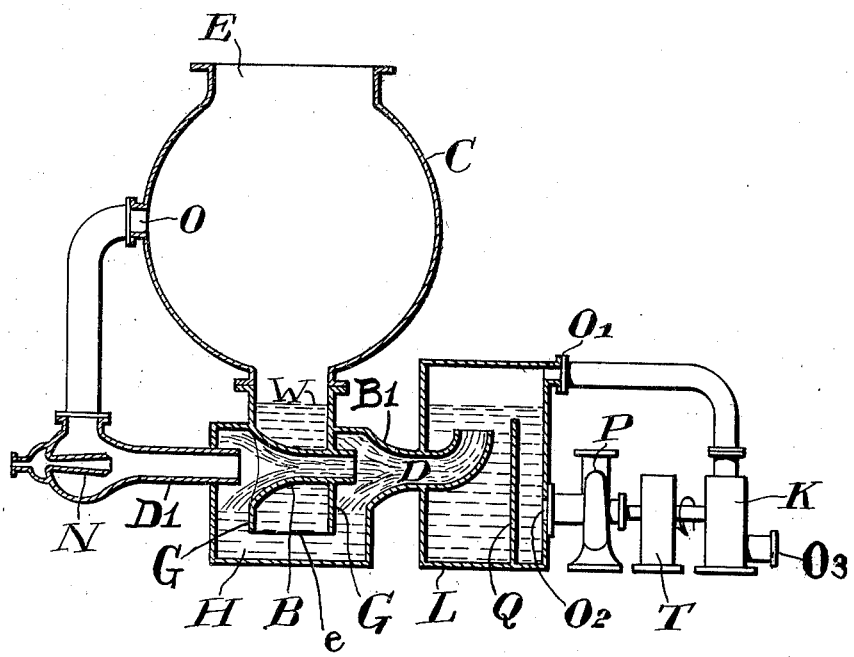
INVENTOR.
Robert Suczek
BY Cornelius D. Ehret
his ATTORNEY.

Patented May 5, 1925.

1,536,243

UNITED STATES PATENT OFFICE.

ROBERT SUCZEK, OF PHILADELPHIA, PENNSYLVANIA, ASSIGNOR TO C. H. WHEELER MANUFACTURING COMPANY, OF PHILADELPHIA, PENNSYLVANIA, A CORPORATION OF PENNSYLVANIA.

AUXILIARY APPARATUS FOR CONDENSERS.

Application filed April 18, 1922. Serial No. 554,514.

*To all whom it may concern:*

Be it known that I, ROBERT SUCZEK, a citizen of the United States, residing in the city and county of Philadelphia, State of Pennsylvania, have invented certain new and useful Improvements in Auxiliary Apparatus for Condensers, of which the following is a specification.

My invention relates to apparatus for removing liquid or gas, or both, by ejector action, from a region or regions of lower pressure to a region or regions of higher pressure.

My invention resides in apparatus for removing condensate or air, or both, from a condenser by ejector action.

In accordance with my invention, liquid, as condensate from a condenser, is operated upon by an ejector submerged therein to deliver the same to a region of higher pressure, the ejector comprising structure for preventing passage of fluid, as air, from the nozzle structure of the ejector in undesired path.

Further in accordance with my invention, there is provided in the ejector structure whereby the fluid path between the outlet and inlet of a mixing tube or combining cone is elongated.

Further in accordance with my invention, the motive fluid for the ejector may be the discharge of another ejector, particularly one utilizing steam as motive fluid for raising the pressure of air, particularly air withdrawn from a condenser whose condensate is to be removed to higher pressure.

My invention resides in the features of construction of the character hereinafter described and claimed.

For an illustration of one of the various forms my invention may take, reference is to be had to the accompanying drawing, which is a vertical sectional view, some parts in elevation, through a condenser and associated air and condensate-removing apparatus.

Referring to the drawing, C represents the shell or body of a condenser, for example, the shell of a surface condenser having an inlet E through which is delivered steam or other vapor, as steam exhausted from a turbine, engine, or from any other source. As well understood in the condenser art, such steam is condensed, as by coming into contact with tubes within the shell C traversed by cooling water. The condensed steam or condensate accumulates in the bottom of the structure, as in the hot well H, the condensate level being indicated at W. The condensate is delivered into the hot well H through the cylindrical passage or tube G, open at its lower end at $e$, where it communicates with the hot well or other receptacle H. Submerged in the liquid in the receptacle H is the guide tube or mixing cone B, whose interior passage diminishes in cross section from its inlet end toward its outlet. The tube B extends through the tube G and its walls, which serve to elongate the path between inlet and outlet of the tube B and which serve also to elongate the path from the inlet or region adjacent the inlet of the tube B to the interior of the condenser C.

Aligned with the tube B is the motive fluid nozzle $D^1$ and the diffuser or discharge tube D of the submerged ejector. The inlet to the diffuser D is a combining tube or cone $B^1$. The motive fluid nozzle $D^1$ is also the diffuser structure of an ejector having the nozzle structure N and whose suction chamber communicates with the port O, through which air is withdrawn from the interior of the condenser C to maintain or produce high vacuum therein. Steam, water or other suitable motive fluid of any suitable pressure is delivered to the nozzle N, which discharges a jet of motive fluid which entrains the air from the condenser C, forming a mixture which is discharged through the nozzle $D^1$, wherein the mixture diminishes in velocity and increases in pressure.

The diffuser D delivers condensate and air into the closed separating chamber L, the air separating from the condensate and passing to the top of chamber L to the outlet $O^1$, which may communicate with the atmosphere or any other region, or, as indicated, may deliver to the suction of a pump K, of any suitable type, for further raising the pressure of the air which is discharged through the port $O^3$ to atmosphere or any other suitable region. The condensate overflows the weir partition Q in the chamber L, and is drawn off through the port $O^2$ by the condensate-removing pump P. The pumps P and K may be driven by any suitable motor, as a steam turbine T.

In operation the motive fluid delivered through the nozzle N removes the air from the condenser C, producing or maintaining high vacuum therein. The mixture of motive fluid and air discharged by the diffuser D¹ becomes the motive fluid for the submerged ejector, the motive fluid causing condensate to be drawn from the receptacle H into and forced through the tube B, the mixture of air and condensate delivered by the tube B being delivered through the combining tube or cone B¹ to the diffuser or tube D, in conjunction with further condensate drawn by the jet into the tube B¹, and the mixture is discharged into the aforesaid separating chamber L.

By providing a wall or partition, as a wall of the tube G, around the inlet of the tube B, air once removed from the condenser C cannot directly pass back into the condenser C, the structure forming a seal or trap for preventing re-entry of air into the condenser C. However, condensate formed within the condenser C passes to the bottom thereof and flows downwardly through the tube G out of its lower end $e$ into the receptacle H, in which it rises fully to submerge the intake and outlet of the tube B. The wall or walls of the tube G form deflectors or partitions which elongate the path between outlet and inlet of the tube B and between outlet and inlet of the tube B and the interior of the condenser C.

When the motive fluid for the nozzle N is steam, the mixture of air with the steam discharged from the nozzle D¹ becomes the motive fluid for the submerged ejector, and the steam and other condensable vapors are condensed by contact with the condensate H and the motive fluid condensate becomes mixed with the condensate from the condenser C.

The motive fluid for the nozzle N, whether steam or water, loses in pressure as between the entry to the nozzle N and the discharge from the nozzle D¹, with the result that the motive fluid for the nozzle structure D¹ of the submerged ejector is low pressure motive fluid, though the air has increased in pressure as between the interior of the condenser C and the outlet of the nozzle D¹.

While I have shown the submerged ejector as utilizing as motive fluid the discharge of another ejector, it will be understood that motive fluid, as steam or liquid, including low pressure motive fluid, may be delivered to the motive fluid nozzle of the submerged ejector from another suitable source than an ejector, or from an ejector whose suction communicates with some receptacle or region other than the condenser C.

The air withdrawn from the condenser C is compressed to a pressure at least as great as that corresponding with the submergence of the discharge of the nozzle D¹ below the water level W. When steam is supplied as the motive fluid to the nozzle N, the steam in issuing from the nozzle D¹ is condensed, thereby producing a vacuum, which causes condensate to be drawn into the tube B, and due to the momentum of the condensate so attained, it is delivered by the tube B to the tube D with sufficient velocity to cause it to issue from the tube D within the chamber L at a still higher pressure, which is generally below atmospheric pressure. The pump K increases the pressure of the air separated in the chamber L to atmospheric pressure or any other suitable pressure, and the pump P simultaneously removes the condensate from chamber L to any suitable higher pressure, as atmospheric pressure.

While the ejectors herein disclosed are of simple single nozzle types, it will be understood that any suitable forms of ejector may be used, as for example, those employing a plurality of steam nozzles, or ejectors having annular nozzles and diffusers, or ejectors of the latter type in which the diffuser is disposed outside of and surrounds the annular nozzle which discharges radially into the diffuser.

The apparatus herein disclosed is disclosed in Letters Patent of the United States No. 1,342,471, granted me June 8, 1920.

What I claim is:

1. In combination with a receptacle containing liquid, wall structure disposed in said receptacle and the liquid therein, a combining tube extending through said wall structure and submerged in said liquid, and nozzle structure delivering motive fluid to said combining tube.

2. In combination with a receptacle containing liquid, nozzle structure having its outlet submerged in said liquid, diffuser structure having its inlet submerged in said liquid, wall structure disposed in said receptacle in the liquid therein between said nozzle and diffuser structures, and a combining tube extending through the said wall structure and disposed intermediate said nozzle and diffuser structures.

3. In combination with a receptacle containing liquid, vertically extending wall structure disposed in said receptacle and the liquid therein, a horizontally disposed tubular member extending through said structure and having its inlet and outlet disposed within said liquid on opposite sides of said wall structure, means for delivering motive fluid into said tubular member and spaced from the inlet of said tubular member, and an outlet for discharging liquid from said receptacle.

4. The combination with a condenser, of a receptacle for the condensate therefrom, partition structure extending into the condensate in said receptacle, guide tube structure extending through said partition structure and having its inlet in open communication with said receptacle, means for delivering impelling fluid to said guide tube structure, and means delivering fluid from said guide tube structure to the exterior of said receptacle.

5. The combination with a condenser, of a receptacle for the condensate therefrom, a plurality of partitions extending into the condensate in said receptacle and spaced from each other, guide tube structure extending through said partitions and submerged in the condensate, means for delivering impelling fluid to said guide tube structure, and means for conducting fluid from said guide tube structure to the exterior of said receptacle.

6. The combination with a condenser and its hot well, of vertically disposed partition structure in said hot well, a guide tube extending through said partition structure and having its inlet submerged in the condensate in said hot well, means for delivering impelling fluid to said guide tube, and means for conducting fluid from said guide tube to the exterior of said hot well.

7. The combination with a condenser and its hot well, of ejector apparatus comprising nozzle and diffuser structures whose outlet and inlet communicate with said hot well, a guide tube between said nozzle and diffuser structures, and a vertical partition in said hot well through which said guide tube extends.

8. The combination with a condenser, of a receptacle for the condensate therefrom, a guide tube in said receptacle, a partition member in said receptacle extending normally to the axis of said guide tube and effecting an elongation of the fluid path between the outlet and inlet of said guide tube, means for delivering impelling fluid to said guide tube, and means for conducting fluid from said guide tube to the exterior of said receptacle.

9. Ejector apparatus comprising nozzle structure delivering motive fluid, diffuser structure, a guide tube disposed in alignment with and between said nozzle and diffuser structures, and a wall member extending beyond the outer wall of said guide tube and effecting elongation of the path from the discharge to the inlet of said tube.

10. Ejector apparatus comprising nozzle structure delivering motive fluid, diffuser structure, a guide tube disposed in alignment with and between said nozzle and diffuser structures, and a wall member extending beyond the outer wall of said guide tube between the inlet and discharge thereof and effecting an elongation of the fluid path between the discharge and inlet of said guide tube.

11. The combination with a condenser, of a receptacle for the condensate therefrom, guide tube structure having its inlet in open communication with said receptacle, partition structure through which said guide tube structure extends and extending into the condensate in said receptacle and elongating the path between the inlet of said guide tube structure and the inlet from said condenser to said receptacle, means for delivering impelling fluid to said guide tube structure, and means delivering fluid to the exterior of said receptacle.

12. The combination with a condenser, of a receptacle for the condensate therefrom, guide tube structure having its inlet in open communication with said receptacle, means withdrawing air from said condenser and delivering it as impelling fluid to said guide tube structure, partition structure through which said guide tube structure extends and extending into said condensate in said receptacle to prevent return of air into said condenser, and means for delivering fluid to the exterior of said receptacle.

13. The combination with a condenser, of a receptacle for the condensate therefrom, tubular structure extending from said condenser into said receptacle, guide tube structure extending through said tubular structure, means for delivering impelling fluid to said guide tube structure, and means for delivering fluid to the exterior of said receptacle.

14. The combination with a condenser, of a receptacle for the condensate therefrom, guide tube structure having its inlet in open communication with said receptacle, tubular structure through which said guide tube structure extends and forming a passage through which condensate is delivered from said condenser to said receptacle, means for withdrawing air from said condenser and delivering it as impelling fluid to said guide tube structure, said tubular structure preventing return of air into said condenser, and means for delivering fluid to the exterior of said receptacle.

15. The combination with a condenser, of a receptacle for the condensate therefrom, guide tube structure having its inlet in open communication with said receptacle, partition structure through which said guide tube structure extends and forming an elongated path between the inlet and outlet of said guide tube structure, and means for delivering elastic impelling fluid into said receptacle adjacent the inlet of said guide tube structure.

16. The combination with a condenser, of a receptacle for the condensate therefrom, a plurality of partitions extending into the condensate in said receptacle and spaced from each other, a plurality of combining tubes, said partitions disposed between the inlet of one of said combining tubes and the outlet of another of said combining tubes, means for delivering impelling fluid to said combining tubes, and means for conducting fluid to the exterior of said receptacle.

17. The combination with a condenser, of a receptacle for the condensate therefrom, a plurality of partitions extending into the condensate in said receptacle and spaced from each other, the space between said partitions forming a passage through which condensate is delivered from said condenser into said receptacle, a plurality of combining tubes, said partitions disposed between the inlet of one of said combining tubes and the outlet of another of said combining tubes, means for delivering impelling fluid to said combining tubes, and means for conducting fluid to the exterior of said receptacle.

18. The combination with a condenser, of a receptacle for the condensate therefrom, guide tube structure having its inlet in open communication with said receptacle, partition structure through which said guide tube structure extends and extending into the condensate in said receptacle and elongating the path between the outlet of said guide tube structure and the inlet from said condenser to said receptacle, means for delivering impelling fluid to said guide tube structure, and means delivering fluid to the exterior of said receptacle.

19. In combination with a condenser, a receptacle for the condensate therefrom, a mixing tube submerged in said condensate, wall structure disposed in said receptacle and the condensate therein, said wall structure being so positioned with respect to said mixing tube as to elongate the path between the inlet and outlet of said tube, means for delivering motive fluid into said tube, and an outlet for discharging condensate from said receptacle.

20. In combination with a condenser, a receptacle for the condensate therefrom, a mixing tube submerged in said condensate, wall structure disposed in said receptacle and the condensate therein in such position with respect to said mixing tube as to effect an elongated path between the inlet of said tube and the interior of said condenser, means for delivering motive fluid into said mixing tube, and an outlet for discharging condensate from said receptacle.

21. In combination with a condenser, a receptacle for the condensate therefrom, a mixing tube submerged in said condensate, wall structure disposed in said receptacle and the condensate therein in such position with respect to said mixing tube as to effect an elongated path between the outlet of said tube and the interior of said condenser, means for delivering motive fluid into said mixing tube, and an outlet for discharging condensate from said receptacle.

22. In combination with a condenser, a receptacle in communication therewith and receiving the condensate therefrom, vertically extending wall structure disposed in said receptacle and the condensate therein, a horizontal mixing tube extending through said wall structure, means for delivering motive fluid into said mixing tube, and an outlet for discharging condensate from said receptacle.

23. In combination with a condenser, a receptacle in communication therewith and receiving the condensate therefrom, vertically extending wall structure disposed in said receptacle and the condensate therein, a horizontal mixing tube extending through said wall structure, means for delivering motive fluid into said mixing tube, and an outlet for discharging condensate from said receptacle, the path in a vertical plane between the inlet and outlet of said mixing tube being elongated by said wall structure.

24. In combination with a condenser, a receptacle in communication therewith and receiving the condensate therefrom, vertically extending wall structure disposed in said receptacle and the condensate therein, a horizontal mixing tube extending through said wall structure, means for delivering motive fluid into said mixing tube, and an outlet for discharging condensate from said receptacle, the path in a vertical plane between the inlet and outlet of said mixing tube being elongated by said wall structure, said wall structure elongating the path between the inlet of said mixing tube and the interior of said condenser.

25. In combination with a condenser, a receptacle in communication therewith and receiving the condensate therefrom, vertically extending wall structure disposed in said receptacle and the condensate therein, a horizontal mixing tube extending through said wall structure, means for delivering motive fluid into said mixing tube, and an outlet for discharging condensate from said receptacle, the path in a vertical plane between the inlet and outlet of said mixing tube being elongated by said wall structure, said wall structure elongating the path between the outlet of said mixing tube and the interior of said condenser.

26. In combination with a condenser, a receptacle for the condensate therefrom, a mixing tube submerged in said condensate, wall structure disposed in said receptacle in said condensate, said mixing tube forming a passage through said wall structure, means for delivering motive fluid into said mixing tube, and an outlet for discharging condensate from said receptacle, 27. In combination with a condenser, a receptacle for the condensate therefrom, a mixing tube submerged in said condensate, wall structure disposed in said receptacle in said condensate, said mixing tube forming a passage through said wall structure, an ejector withdrawing air from said condenser and discharging to said mixing tube, and an outlet for discharging condensate from said receptacle.

28. In combination with a receptacle containing liquid, of an ejector comprising a motive fluid nozzle and a combining tube submerged in said liquid and having their axes substantially horizontal, and vertically extending walls spaced from each other horizontally forming a space in which said liquid is disposed, said combining tube extending through at least one of said walls.

29. In combination, a condenser, a condensate receptacle, an ejector submerged in the condensate in said receptacle and comprising a motive fluid nozzle and a combining tube, and walls spaced from each other axially of said combining tube and forming a space between which condensate is disposed, said combining tube extending through at least one of said walls.

In testimony whereof I have hereunto affixed my signature this 17th day of April, 1922.

ROBERT SUCZEK.